United States Patent
Tseng et al.

(10) Patent No.: US 8,694,223 B2
(45) Date of Patent: Apr. 8, 2014

(54) ADAPTIVE TRACTION CONTROL SYSTEM

(75) Inventors: Hongtei Eric Tseng, Canton, MI (US); Michael Fodor, Dearborn, MI (US); Davor Hrovat, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 662 days.

(21) Appl. No.: 12/388,804

(22) Filed: Feb. 19, 2009

(65) Prior Publication Data
US 2009/0150037 A1    Jun. 11, 2009

Related U.S. Application Data

(62) Division of application No. 11/160,116, filed on Jun. 9, 2005, now Pat. No. 7,529,611.

(51) Int. Cl.
   *B60T 7/12*      (2006.01)
   *G05D 1/00*      (2006.01)
   *G06F 7/00*      (2006.01)
   *G06F 17/00*     (2006.01)

(52) U.S. Cl.
   USPC ............... 701/82; 701/71; 701/74; 701/75; 180/197

(58) Field of Classification Search
   USPC ............. 701/71, 82, 36, 45, 70, 74, 75, 90; 180/197; 303/121; 361/238; 280/757
   See application file for complete search history.

(56) References Cited

U.S. PATENT DOCUMENTS

| | | |
|---|---|---|
| 3,680,655 A | 8/1972 | Beyerlein et al. |
| 4,545,455 A | 10/1985 | Kanemura et al. |
| 4,600,215 A | 7/1986 | Kuroki et al. |

(Continued)

FOREIGN PATENT DOCUMENTS

| | | |
|---|---|---|
| DE | 44 18 070 C1 | 10/1995 |
| DE | 198 10 213 A1 | 9/1999 |

(Continued)

OTHER PUBLICATIONS

Examination report from co-pending German Application No. 10 2006 026 716.8-21 dated Apr. 27, 2010.

(Continued)

*Primary Examiner* — Rami Khatib
(74) *Attorney, Agent, or Firm* — O'Brien Jones PLLC; Raymond L. Coppiellie

(57) ABSTRACT

A method of controlling a traction control system (30) includes continuously adapting a steady state driven wheel speed to reference wheel speed ratio, so that said traction control system can avoid unnecessary actuations (e.g., demanding torque reduction). The continuous adaptation methodology provides traction control robustness to vehicles equipped with a spare tire, or a different final drive such as in the use of aftermarket parts. The method includes a dual rate adaptation that allows both fast adaptation and fine tuning capabilities of the ratio. The method includes comparing the instant driven wheel speed to reference wheel speed ratio to the filtered driven wheel speed to reference wheel speed ratio, to obtain a ratio difference. When the difference is above a threshold, the first filter constant is selected and the first constant is applied to an adaptation filter, resulting in a first filtered and adapted ratio. The traction control system is controlled with the adapted ratio. When the difference is below the threshold, the second filter constant is selected and the selected constant is applied to the adaptation filter, resulting in the second filtered and adapted ratio. The traction control system is controlled with the adapted ratio.

12 Claims, 2 Drawing Sheets

(56) References Cited

U.S. PATENT DOCUMENTS

| | | | |
|---|---|---|---|
| 4,725,072 A | 2/1988 | Asami et al. | |
| 4,825,368 A | 4/1989 | Itoh et al. | |
| 4,844,557 A | 7/1989 | Giers | |
| 5,012,417 A | 4/1991 | Watanabe et al. | |
| 5,163,743 A | 11/1992 | Leppek et al. | |
| 5,292,184 A | 3/1994 | Takata | |
| 5,357,434 A | 10/1994 | Zimmer et al. | |
| 5,415,468 A | 5/1995 | Latarnik et al. | |
| 5,479,811 A | 1/1996 | Baumann et al. | |
| 5,481,455 A | 1/1996 | Iwata et al. | |
| 5,485,380 A | 1/1996 | Takasuka et al. | |
| 5,492,192 A | 2/1996 | Brooks et al. | |
| 5,591,906 A | 1/1997 | Okawa et al. | |
| 5,646,849 A | 7/1997 | Walenty et al. | |
| 5,650,718 A | 7/1997 | Stuible et al. | |
| 5,699,251 A | 12/1997 | Mori et al. | |
| 5,725,067 A | 3/1998 | Ikeda et al. | |
| 5,748,474 A | 5/1998 | Masuda et al. | |
| 5,748,503 A | 5/1998 | Saeki et al. | |
| 5,929,329 A | 7/1999 | Burkhard et al. | |
| 5,995,897 A | 11/1999 | Oshiro et al. | |
| 6,023,649 A | 2/2000 | Matsuura et al. | |
| 6,199,005 B1 | 3/2001 | Iwata | |
| 6,349,255 B1 | 2/2002 | Heckmann et al. | |
| 6,438,480 B2 | 8/2002 | Tanaka et al. | |
| 6,470,254 B1 | 10/2002 | Schmitt et al. | |
| 6,535,809 B1 | 3/2003 | Beyer et al. | |
| 6,618,662 B2 * | 9/2003 | Schmitt et al. | 701/82 |
| 6,631,320 B1 | 10/2003 | Holt et al. | |
| 6,691,013 B1 | 2/2004 | Brown | |
| 6,842,681 B2 | 1/2005 | Imai et al. | |
| 6,851,766 B2 * | 2/2005 | Ishikawa et al. | 303/139 |
| 6,907,778 B2 * | 6/2005 | Kogure et al. | 73/146 |
| 7,071,642 B2 * | 7/2006 | Wilton et al. | 318/268 |
| 7,222,014 B2 * | 5/2007 | Tao et al. | 701/87 |
| 7,248,953 B2 | 7/2007 | Ogawa | |
| 7,434,647 B2 | 10/2008 | Sugo et al. | |
| 2002/0002436 A1 | 1/2002 | Nishida et al. | |
| 2002/0007242 A1 | 1/2002 | Tanaka et al. | |
| 2002/0095253 A1 | 7/2002 | Losey et al. | |
| 2004/0220714 A1 * | 11/2004 | Rudd, III | 701/71 |
| 2006/0142912 A1 | 6/2006 | Oshiro | |
| 2006/0282207 A1 | 12/2006 | Tseng et al. | |

FOREIGN PATENT DOCUMENTS

| | | |
|---|---|---|
| DE | 102006031587 A1 | 1/2008 |
| EP | 0220115 A1 | 4/1987 |
| EP | 0 508 146 A2 | 10/1992 |
| EP | 0 763 453 A | 3/1997 |
| GB | 2315051 A | 1/1998 |

OTHER PUBLICATIONS

Random House Dictionary, definition of "ratio," 1980.
Ventura et al., "An Embedded System to Assess the Automotive Shock Absorber Condition Under Vehicle Operation," IEEE Sensors 2008 Conference (pp. 1210-1213).

* cited by examiner

ADAPTIVE TRACTION CONTROL SYSTEM

This application is a divisional of U.S. application Ser. No. 11/160,116, filed Jun. 9, 2005, now U.S. Pat. No. 7,529,611 which is incorporated herein by reference.

TECHNICAL FIELD

The present invention relates generally to a traction control system, and more particularly, to a drive control system that adapts to changed vehicle components such as a mini spare tire.

BACKGROUND

Traction control systems generally use braking and engine intervention to reduce wheel slip at the driven wheels of the vehicle. The non-driven wheel speeds provide a source for a reference speed of the vehicle. In current systems the assumption is that both the driven and non-driven wheels have a same or similar tire rolling radius. In certain situations, a customer may modify the wheel or tire size significantly. One example of a customer modification is the use of a mini spare tire. When using a mini spare tire, a traction control system may falsely activate. Also, customers, particularly in trucks, may modify the differential, which in turn may falsely activate the traction control system.

It would therefore be desirable to automatically adjust the traction control system to reduce the amount of false activations.

SUMMARY

The present invention improves a traction control system by allowing the traction control system to adjust to a change in the rolling radius of a vehicle such as when a wheel has been replaced by a mini spare. The present invention also allows a modification of the driven to non-driven wheel ratio in the case when a differential has been modified by the customer.

In one aspect of the invention, a method for controlling a traction control system includes determining a reference speed, determining a driven wheel speed, and determining a long term filter value. The method further includes determining a long term wheel speed ratio from the reference speed, the driven wheel speed, and the long term filter. A short term wheel speed ratio is determined from the reference speed and the driven wheel speed.

One advantage of the invention is that when a customer installs a wheel with a different radius, such as a spare tire or custom wheels, or the customer installs a different differential, the traction control system rapidly adapts to prevent false activations.

Other advantages and features of the present invention will become apparent when viewed in light of the detailed description of the preferred embodiment when taken in conjunction with the attached drawings and appended claims.

DETAILED DESCRIPTION OF THE PREFERRED EMBODIMENT

Figure 1:
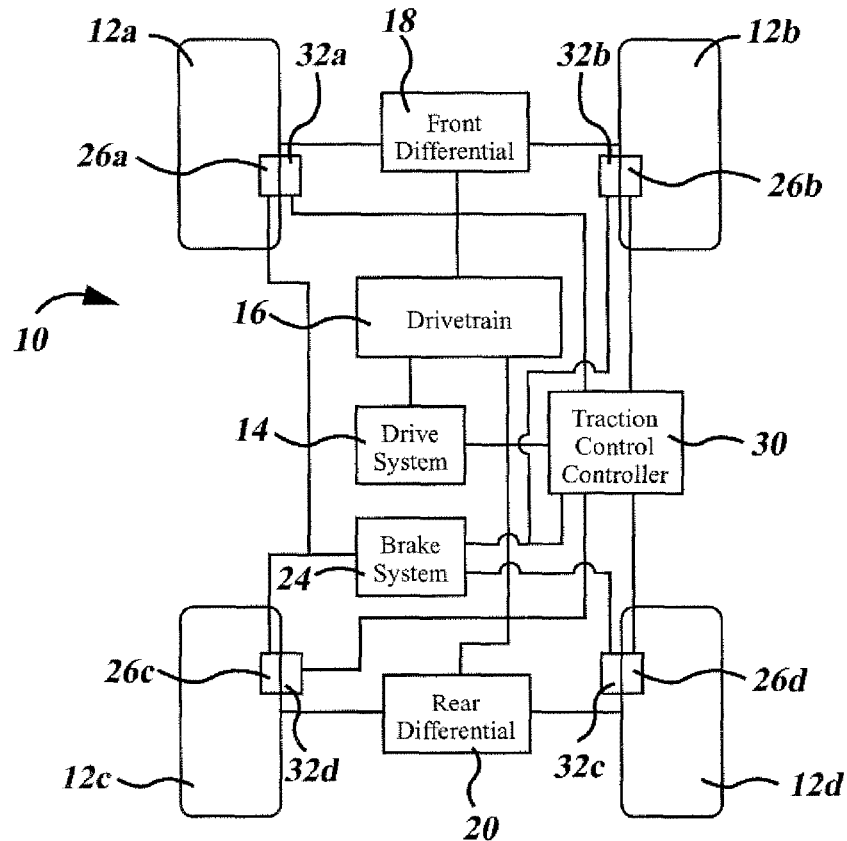
FIG. 1 is a block diagrammatic view of a vehicle having a traction control system according to the present invention.

The following figures describe a traction control system that may be used for an engine only traction control system. However, the teachings of the present invention may also be applicable to engine and brake-type traction control systems.

An automotive vehicle 10 is illustrated having wheel and tire assemblies 12a, 12b, 12c, and 12d. A drive system 14 coupled to a drivetrain 16 provides power to the wheel and tire assemblies 12 through the front differential 18 and rear differential 20. The drive system 14 may include an engine controller that is microprocessor-based. The engine controller may be used to control the amount of torque and thus the amount of slip generated at each of the wheels. The drive system 14 may vary the amount of engine power to effect the change in torque at the wheel and tire assemblies 12. A reduction in the amount of fuel and changing other parameters may reduce the amount of power output from the engine. It should also be noted that the drive system may include an internal combustion-only type system, a hybrid system, an electric drive system, or a fuel cell system.

The drive system 14 provides torque through the drivetrain 16 which may include a transmission, front differential 18 and rear differential 20. In a rear wheel drive vehicle, only the rear differential 20 would be present. A four or all-wheel drive system may include both the front differential 18 and the rear differential 20. Also, in certain all-wheel drive systems an additional center differential may be provided.

A brake system 24 that may include electric, electro-hydraulic, or hydraulic systems is used to actuate the brakes 26a, 26b, 26c, and 26d. The brakes are activated in response to driver input. The brake system 24 may also be activated in response to a traction control system that include a traction control controller 30.

The traction control system and thus the controller 30 may be coupled directly or indirectly to wheel speed sensors 32a, 32b, 32c, and 32d. As illustrated, the wheel speed sensors are coupled directly to the wheels. The wheel speed sensors may be the output from an anti-lock brake system, an axle sensor or the like.

It should be noted that the wheels driven by the drive system 14 are referred to as driven wheels whereas wheels that are not coupled to the engine are referred to as undriven wheels. In the following description the speed of the undriven wheels may be used as the reference speed. In four-wheel or all-wheel drive systems no wheels are undriven and thus various algorithms may be used to determine the reference speed. The reference speed may correspond to a vehicle speed. Wheels that are touching the road surface and have a torque level below a certain torque threshold may be included in such algorithms.

The traction controller 30 is coupled to the drive system 14. The traction controller 30 may generate a control signal or torque command to reduce the amount of torque to the engine upon the sensing of a slipping wheel.

Figure 2:
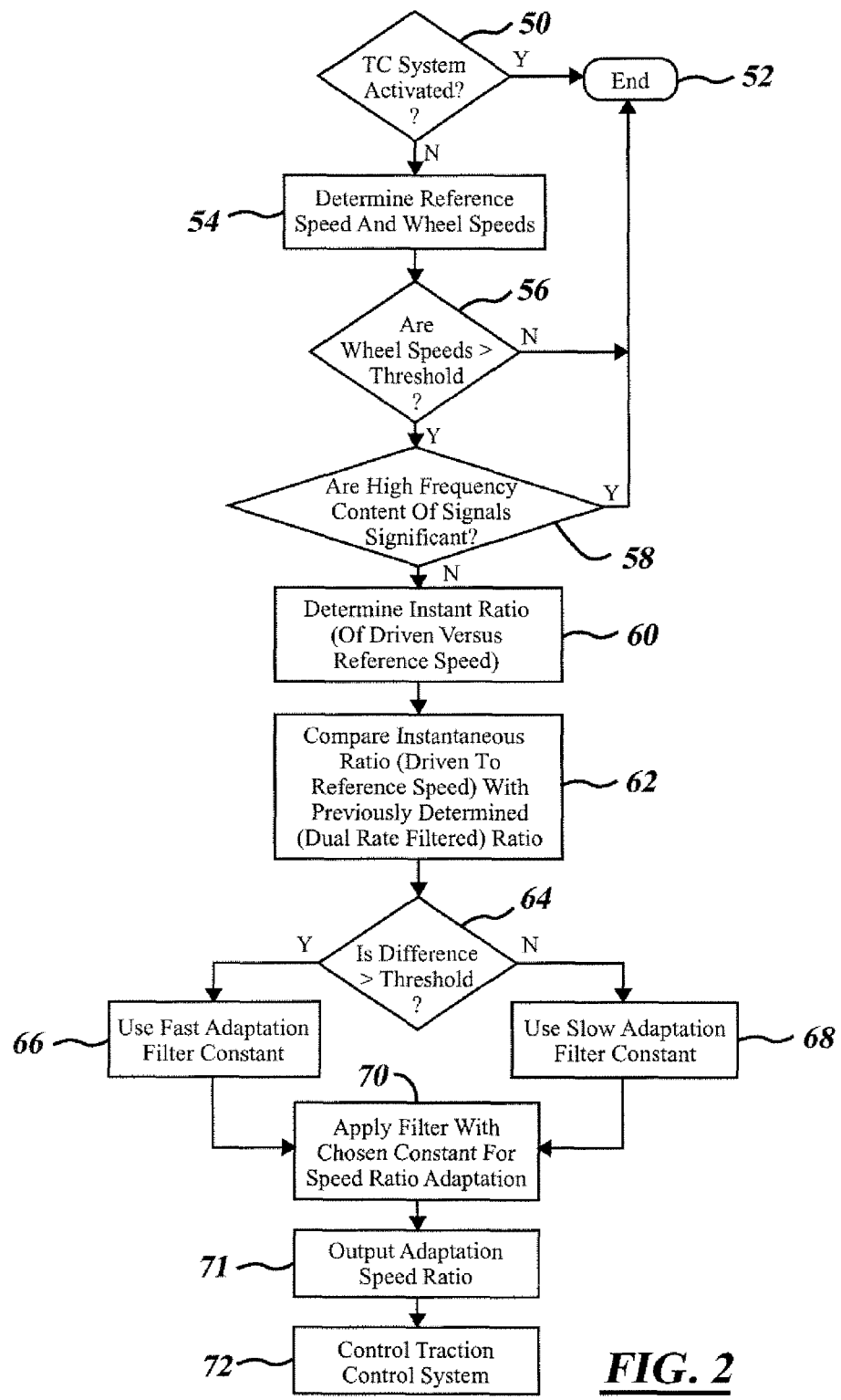
FIG. 2 is a flow chart illustrating the operation of the present invention.

Referring now to FIG. 2, a method for operating a traction control system is set forth. In step 50 it is determined whether the traction control system has been activated. If the traction control system has been activated, determining the wheel speeds and the like may be affected by the system and thus not reliable. Therefore, the process ends in step 52. In step 54, the reference speed and the wheel speeds are determined. The reference speed as mentioned above may be derived from the underdriven wheels or from an algorithm determining the vehicle speed. The wheel speeds of the driven wheels are also determined. In step 56, when the wheel speeds are not above a threshold, step 52 ends the process. That is, when a sufficient amount of speed is not provided in the vehicle, the system may not be activated. In step 56, if the wheel speeds are above a threshold, step 58 determines whether the signals are noisy, i.e. if the high frequency content of the signals is significant or above a noise threshold. If the signals are noisy, a proper signal to noise ratio for an accurate determination may not be present. Therefore, step 52 is executed when the signals are noisy.

In step 60, an instant ratio of the driven to non-driven wheels or the driven wheels to a reference speed is determined. That is, the current ratio between the non-driven and driven wheels may be determined. The ratio may include the ratio of the wheel speeds which ultimately may be used to determine the ratios and the rolling radius or the drivetrain or differential gear ratios.

In step 62, the instant ratio is compared to the dual rate filtered ratio that is constantly being adapted. In step 64, the instant and the long term or dual rate filtered ratios are compared. When the difference is greater than a certain percentage or a certain amount, both of which may be referred to as a threshold, step 66 is performed. In step 66, fast adaptation filter constant is used when the amount is greater than the threshold. In step 64, if the difference is less than the threshold, step 68 uses a slow adaptation and thus a slow adaptation filter constant is used. In this embodiment various filtering schemes such as averaging may be provided over the long term so that the values of the ratio slowly change. Such conditions that slowly change include tire pressure loss and tread wear which slowly change the rolling radius of the tire and wheel assembly. Steps 66 and 68 are used to apply an adapted speed ratio output in step 71. The adapted ratio output may be representative of the rolling radius ratio and the differential gear ratio of the vehicle. The final ratio output may be the driven to non-driven wheel output in a two-wheel drive vehicle, and driven to a reference vehicle velocity in a four-wheel drive or all-wheel drive vehicle. In step 72 the traction control system is controlled in response to the final ratio output. This allows the differences in rolling radius and differential gear ratios to be accommodated in the system to prevent false activations. As will be appreciated, the above process may be performed continuously so that the ratio is constantly adapted when the conditions of steps 50-58 are met.

Figure 3:
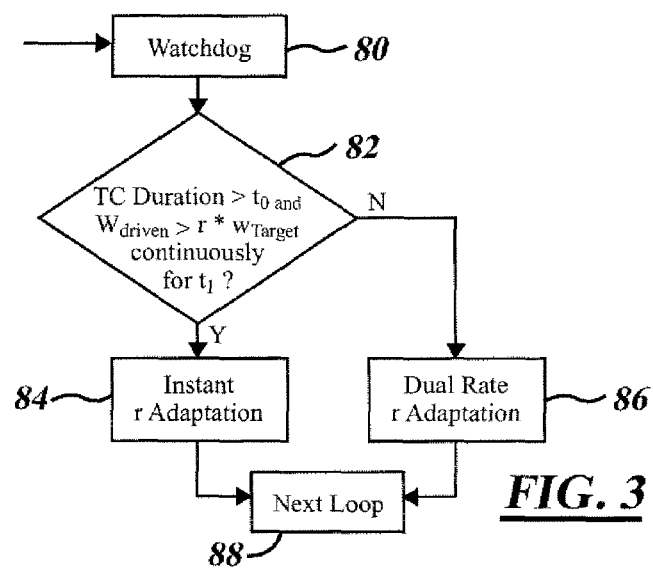
FIG. 3 is a flow chart illustrating the operation of a watchdog for the flow chart illustrated in FIG. 2.

Referring now to FIG. 3, in certain situations the traction control system may not catch various conditions soon enough. Therefore, in step 80 a watchdog for the entire system is used. In step 82 the duration that the traction control is operated is compared to a threshold $T_0$. Also, the driven wheel speed $W_{driven}$ is compared to a factor multiplied by the target wheel speed. If the driven wheel speed is above the R times $W_{target}$ continuously for a time threshold $T_1$, instant adaptation may be performed in step 84. The watchdog essentially is looking for conditions that are not physically plausible. That is, if no torque is being applied for a long duration, the wheels should not be spinning. Instant adaptation in step 84 includes taking the ratio of the driven to non-driven wheels or driven wheels to reference vehicle at the time the step is performed. This allows instant adaptation of the rate. In step 82, if the conditions are not met the dual rate adaptation illustrated in FIG. 2 is performed in step 86. After steps 84 and 86, a next loop is performed in step 88.

While particular embodiments of the invention have been shown and described, numerous variations and alternate embodiments will occur to those skilled in the art. Accordingly, it is intended that the invention be limited only in terms of the appended claims.

What is claimed is:

1. A method for controlling a traction control system, comprising:
adapting, using a controller, a ratio representing a driven wheel speed to a reference wheel speed before inputting the ratio to the traction control system,
wherein adapting the ratio comprises applying a first adaptation filter constant or a second adaptation filter constant, which differs from the first adaptation filter constant, to the ratio; and
controlling the traction control system in response to the adapted ratio.

2. The method of claim 1, wherein the reference wheel speed comprises a speed of undriven wheels.

3. The method of claim 2, wherein the driven wheel speed represents an average speed of two driven wheels.

4. The method of claim 2, wherein the ratio comprises a ratio of an average driven wheel speed to an average undriven wheel speed.

5. The method of claim 1, wherein adapting the ratio comprises adapting an instant ratio representing the driven wheel speed to the reference wheel speed.

6. The method of claim 5, wherein the second adaption filter constant is applied when a difference between the instant ratio and a previously determined ratio is less than a threshold value,
wherein the previously determined ratio is derived from a long-term filter value and the ratio of the driven wheel speed to the reference wheel speed.

7. The method of claim 5, wherein the first adaption filter constant is applied when a difference between the instant ratio and a previously determined ratio is greater than a threshold value,
wherein the previously determined ratio is derived from a long-term filter value and the ratio of the driven wheel speed to the reference wheel speed.

8. A method for controlling a traction control system comprising: operating, using a controller, the traction control system in response to
an instant wheel speed ratio representing a ratio of a speed of driven wheels to a reference wheel speed, and
previously determined wheel speed ratio derived from a predetermined filter value and the ratio of the speed of driven wheels to the reference wheel speed.

9. The method of claim 8, wherein the predetermined filter value comprises a predetermined average.

10. The method of claim 8, wherein the reference wheel speed comprises a speed of undriven wheels.

11. The method of claim 10, wherein the driven wheel speed represents an average speed of two driven wheels.

12. The method of claim 10 further comprising, when the traction control system is activated, operating the traction control system in response to a current ratio representing a ratio of a current speed of driven wheels to a current reference speed when a traction control duration exceeds a first time limit and the current speed of driven wheels is greater than a target wheel speed continuously for a second time period.

* * * * *